April 19, 1938.    L. A. TURNER ET AL    2,114,771

PIPE JOINT AND PACKING RING FOR USE THEREIN

Filed Nov. 2, 1936

INVENTORS.
L. A. TURNER
E. G. LATHAM.
BY
ATTORNEYS.

Patented Apr. 19, 1938

2,114,771

UNITED STATES PATENT OFFICE 2,114,771

PIPE JOINT AND PACKING RING FOR USE THEREIN

Lionel Alfred Turner, Widnes, and Edward George Latham, Daveyhulme, Manchester, England, assignors to Turner & Newall Limited, Rochdale, England, a British company Application November 2, 1936, Serial No. 108,838
In Great Britain November 16, 1935

2 Claims. (Cl. 285—123)

This invention relates to pipe joints and to packing rings for use in such joints. The invention is concerned with that type of joint in which a packing ring is driven by a collar into an angle between two surfaces to be sealed. The invention is primarily applicable to joints made by surrounding two abutting pipe ends by an externally screw-threaded sleeve and screwing a collar over each end of the sleeve to force a packing ring between the end of the sleeve and the pipe which that end overlaps. The invention may be applied also to socket joints in which one pipe end enters a socket on the other pipe end.

The design of a packing ring which will give absolute satisfaction in service presents great difficulties and the main object of the present invention is to design such a ring. A further object of the invention is to provide a packing ring which can be forced home by screwing up a collar without being damaged. With this object in view we make packing rings with a main body portion of flexible rubber provided on the face engaged by the collar but only on that face with a backing consisting of hard or semi-hard rubber or indurated asbestos fabric secured to the body portion by vulcanization and constituting a bearing surface on which the collar can slide. This construction has the great advantage that the hard sliding surface which is engaged by the collar renders it possible to compress the packing ring by applying a sliding or screwing compressive force without twisting or distorting it in any way. In comparison with packing rings having metallic backings, the novel packing rings are substantially more flexible and will accommodate themselves much more readily to the usual variations in the outside diameters of the pipes; further they are practically immune from permanent and destructive distortion and are not damaged or spoilt by slight distortion as is the case with rings having metallic backings. A further important advantage is that all the surface of the rubber body except that engaged by the collar can bear directly against the surfaces to be sealed, which is not the case when the body is provided with a metallic sheathing.

Rubber packing rings which are employed in gas pipes are subject to attack by condensates such as naptha so that in course of time leakage occurs. A further object of the invention is to remedy this defect, and this is effected by providing the front face of a deformable rubber packing ring (preferably of the kind described) with an easily flexible or deformable covering of asbestos fabric which protects the rubber from attack. It is known to provide a lead tip to a deformable packing but we have found that absolute fluid-tightness under exacting conditions of service can only be obtained when the body and tip of the ring are absolutely flexible and can alter their shape as the joint moves. It is therefore necessary to avoid the use of lead or other material which cannot readily accommodate itself to movement of the joint and which may easily be permanently distorted or deformed in transit. A further advantage of the use of a fabric tip is that this also enables the ring to accommodate itself readily to variations in the outside diameters of the pipes. Such fabric-tipped rings may also be used if the rubber is to be prevented from coming into contact with oil, acids and so forth.

The fabric tip may be secured to the rubber by rubber solution and in such a case only enough rubber solution is employed to act as a jointing medium. On the other hand the asbestos fabric that acts as the backing must be hard enough to provide a smooth sliding surface, and if it is indurated with hard rubber, that rubber may serve both as a hardening and as a jointing medium. The asbestos fabric backing may be indurated with a synthetic resin instead of rubber.

An important feature of the invention consists in making the ring approximately circular in cross-section and compressing into a glandular recess of approximately triangular or frusto-conical cross-section, as it is found that in this way exceptional fluid-tightness and resilience are obtained.

A joint embodying our invention will now be described by way of example with reference to the accompanying drawing in which:—

Figure 1:
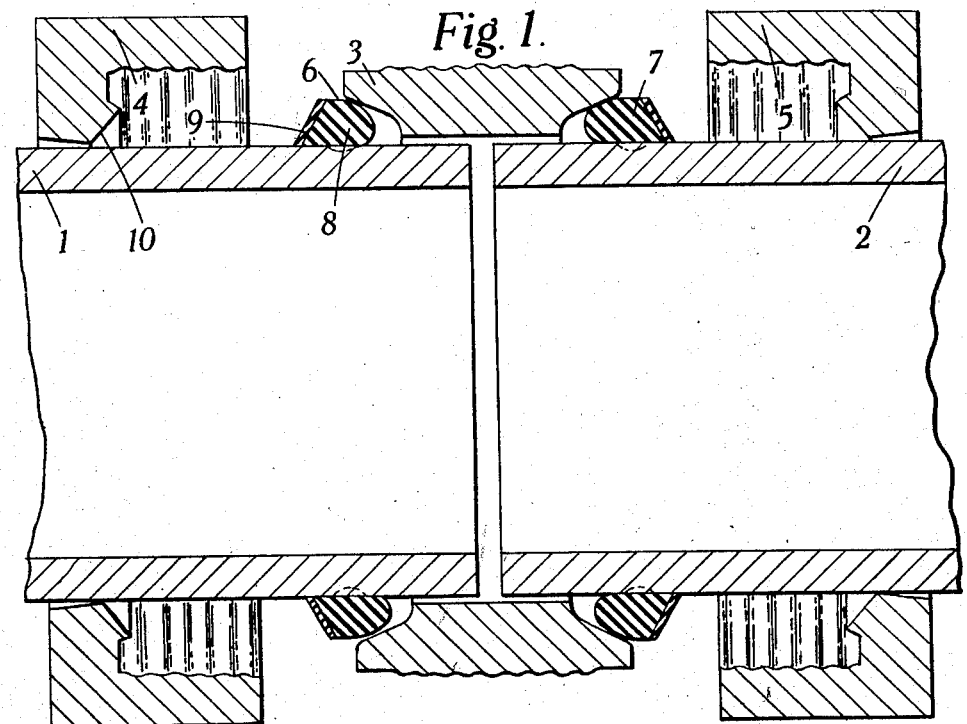
Figure 1 shows the joint in the process of assembly.
Figure 2:
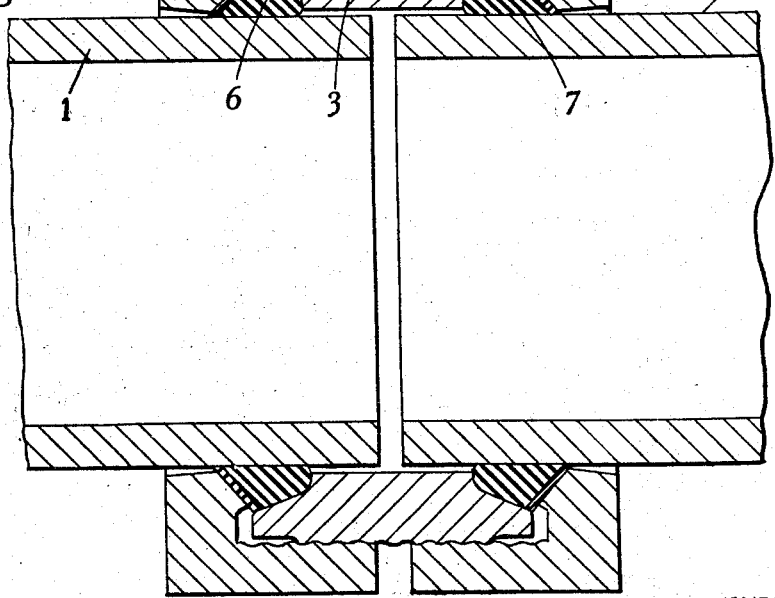
Figure 2 shows the assembly of joint.

The two pipes to be joined are marked 1 and 2. An externally screw-threaded sleeve 3 is placed over their abutting ends and two collars 4 and 5 each internally screw-threaded are caused to engage the sleeve. These collars force two packing rings, 6 and 7 respectively, between the ends of the sleeve and the outer surfaces of the pipes. Each packing ring consists of a body portion 8 of soft rubber to which a backing 9 of hard rubber about 1/16 of an inch thick is secured by vulcanization. As is clearly shown in Figure 1 the backing 9 is set at an angle to the pipe 1, this angle being 60° in the preferred construction that is illustrated. The collar 4 is provided with an inclined surface 10 which engages the backing 9 and it has been found advantageous to make the angle between the surface 10 and the pipe less than that between the backing 9 and the pipe by about 5 to 15°, the surface 10 actually making an angle of 50° with the pipe 1 in the construction illustrated. When the joint is assembled by screwing up the collars 4 and 5 the packing ring is deformed and the angle of the backing is altered as is clearly shown in Figure 2.

Figure 3:
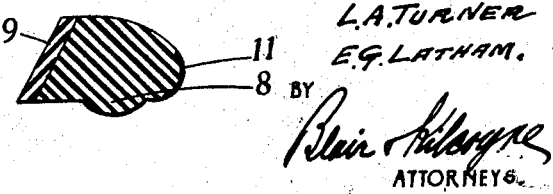
Figure 3 shows a cross-section through one packing ring before the assembly of the joint.

In order to improve the resistance of the packing ring to attack by condensates, it is provided on its front face with a deformable asbestos fabric covering 11 as shown in Figure 3.

We claim:—

1. A gasket for use in pipe couplings including a pipe, a recessed sleeve and a threaded member co-acting with the sleeve and adapted to apply pressure to the gasket, said gasket having its major portion made of soft deformable rubber and provided on its pipe engaging face with an annular protuberance of smaller diameter than the external diameter of the pipe with which it is used, the part of said gasket adapted to be engaged by the threaded member being substantially homogeneous but of harder material than the major portion and having a plain surface lying at an angle to the plane of the portion of the member engaged thereby, whereby as the threaded member is screwed down on the sleeve the gasket will be deformed to completely fill the recess in the sleeve and constitute the sole sealing means at the joint.

2. A gasket for use in pipe couplings including a pipe, a recessed sleeve and a threaded member co-acting with the sleeve and adapted to apply pressure to the gasket, said gasket having its major portion made of soft deformable rubber and provided on its pipe engaging face with an annular protuberance of smaller diameter than the external diameter of the pipe with which it is used, the part of said gasket adapted to be engaged by the threaded member being substantially homogeneous but of hard rubber and having a plain surface lying at an angle to the plane of the portion of the member engaged thereby, whereby as the threaded member is screwed down on the sleeve the gasket will be deformed particularly at the tip to completely fill the recess in the sleeve and constitute the sole sealing means at the joint, said tip being rounded and of greater diameter than the recess within the sleeve adapted to be engaged thereby.

LIONEL ALFRED TURNER.
EDWARD GEORGE LATHAM.